United States Patent
Shoshi et al.

(10) Patent No.: US 7,141,298 B2
(45) Date of Patent: Nov. 28, 2006

(54) HARD COAT FILM

(75) Inventors: Satoru Shoshi, Koshigaya (JP); Yuki Hongo, Nakano-ku (JP); Yoshitaka Takesako, Tatsuno (JP)

(73) Assignee: Lintec Corporation, Tokyo (JP)

( * ) Notice: Subject to any disclaimer, the term of this patent is extended or adjusted under 35 U.S.C. 154(b) by 238 days.

(21) Appl. No.: 10/681,069

(22) Filed: Oct. 8, 2003

(65) Prior Publication Data
US 2004/0081831 A1    Apr. 29, 2004

(30) Foreign Application Priority Data
Oct. 29, 2002    (JP)    ............................ 2002-314757

(51) Int. Cl.
*B32B 27/08*    (2006.01)
(52) U.S. Cl. ...................... 428/331; 428/412; 428/451; 428/483
(58) Field of Classification Search ............... 428/331, 428/451, 412, 483
See application file for complete search history.

(56) References Cited

U.S. PATENT DOCUMENTS
2002/0058737 A1* 5/2002 Nishiwaki et al. .......... 524/431

FOREIGN PATENT DOCUMENTS
JP        2000-171603 A    6/2000

* cited by examiner

*Primary Examiner*—D. S. Nakarani
(74) *Attorney, Agent, or Firm*—Frishauf, Holtz, Goodman & Chick, P.C.

(57) ABSTRACT

A hard coat film comprises a hard coat layer formed by coating at least one face of a substrate with a coating fluid and curing the obtained coating layer by irradiation with an ionizing radiation. The coating fluid comprises a component for forming a hard coat layer comprising (A) a compound which is formed by bonding an organic compound having a polymerizable unsaturated group to fine particles of silica, (B) an ester of (meth)acrylic acid having an alicyclic structure and (C) a compound having at least two polymerizable unsaturated groups and at least one aryl group in a molecule. The hard coat layer comprises 20 to 60% by weight of silica and has a refractive index of 1.53 or greater. The hard coat film exhibits excellent scratch resistance, little shrinking by curing and little shrinking and curling under high temperature and humidity and forms no optical interference fringes.

21 Claims, 1 Drawing Sheet

HARD COAT FILM

BACKGROUND OF THE INVENTION

1. Field of the Invention

The present invention relates to a hard coat film. More particularly, the present invention relates to a hard coat film used for surface protection of touch panels of the resistance film type and optical disks.

2. Description of Related Art

Hard coat films have heretofore been used for protection of surfaces in various image display apparatuses such as LCD (liquid crystal displays), touch panels, CRT (cathode ray tubes), PDP (plasma display panels), EL (electroluminescence displays) and optical disks.

Touch panels are used as the input apparatus for portable information terminals which are being widely used in recent years. The touch panel is an apparatus for inputting data by directly touching the surface of a display by a finger or a pen. About 90 percent of the entire touch panels are the touch panels of the resistance film type. The touch panel of the resistance film type has, in general, a structure in which a plastic substrate of the touching side which has a transparent electrically conductive (referred to as "conductive", hereinafter) thin film such as a film of indium oxide doped with tin (ITO) laminated on one face of a transparent plastic substrate and a transparent substrate of the display side which has a transparent conductive thin film such as an ITO film laminated on one face of a transparent substrate material such as a glass plate are arranged with an insulating spacer placed between the two substrates in a manner such that the transparent conductive thin films in the two substrates are faced to each other. For the input operation, the face for input by touching (the face opposite to the face having the transparent conductive thin film) of the plastic substrate of the touching side is pressed by a pen or a finger and the transparent conductive thin film of the plastic substrate of the touching side and the transparent conductive thin film of the display side are brought into contact with each other.

However, the touch panel of the resistance film type has a problem in that the surface of the touching side is damaged and the transparent conductive thin film in the plastic substrate (the substrate material film) of the touching side is worn, has cracks or separated from the substrate after the transparent conductive thin film of the plastic substrate of the touching side and the transparent conductive film of the transparent substrate of the display side are repeatedly brought into contact with each other. To overcome the above problem, it is widely conducted that hard coat layers of a synthetic resin are disposed on the surface of the touching side and between the transparent plastic substrate and the transparent conductive thin film.

A polarizing film in which a film for prevention of reflection is disposed on a hard coat layer containing a resin curable with radiation or the like and ultra-fine particles of titanium oxide treated on the surface with a metal oxide or the like to improve the surface of the touching side is proposed (Japanese Patent Application Laid-Open No. 2000-171603).

Conventional hard coat films having a hard coat layer formed and kept on a substrate film by curing by heating or by irradiating an ionizing radiation exhibit shrinking by curing and shrinking under the condition of a high temperature and a high humidity markedly and tend to cause the curling phenomenon in which end portions of the hard coat films are curled up since the constituting components in the conventional technology are mostly polyfunctional acrylates. Moreover, optical interference fringes are occasionally formed due to the difference in the refractive index between the substrate film and the hard coat layer and a method to overcome the drawback is additionally required. The drawbacks of the conventional hard coat films are the shrinking by curing, the shrinking and curling under the effect of a higher temperature and a high humidity and the optical interference fringes.

SUMMARY OF THE INVENTION

The present invention has an object of providing a hard coat film exhibiting excellent scratch resistance, little shrinking by curing and little shrinking and curling under a high temperature and a high humidity and forming no optical interference fringes.

As the result of intensive studies by the present inventors, it was found that the above object could be achieved when polymerizable fine particles of silica were contained in the hard coat layer in a specific amount and the component for forming a hard coat layer contained an ester of (meth)acrylic acid having an alicyclic structure and a compound having at least two polymerizable unsaturated groups and at least one aryl group in the molecule. The present invention has been completed based on this knowledge.

The present invention provides:

(1) A hard coat film which comprises a hard coat layer formed by coating at least one face of a substrate with a coating fluid which comprises a component for forming a hard coat layer comprising (A) a compound which is formed by bonding an organic compound having a polymerizable unsaturated group to fine particles of silica, (B) an ester of (meth)acrylic acid having an alicyclic structure and (C) a compound having at least two polymerizable unsaturated groups and at least one aryl group in a molecule, and curing a layer of the coating fluid formed on the face of the substrate by irradiation with an ionizing radiation, wherein the hard coat layer comprises 20 to 60% by weight of silica and has a refractive index of 1.53 or greater;

(2) A hard coat film according to (1), wherein the organic compound having a polymerizable unsaturated group which is bonded to the fine particles of silica in the compound (A) is a compound having (meth)acryloyl group and at least one group selected from the group consisting of alkoxyl group and isocyanate group;

(3) A hard coat film according to (1) or (2), wherein the ester of (meth)acrylic acid having an alicyclic structure (B) is dicyclopentanyl acrylate;

(4) A hard coat film according to any one of (1) to (3), wherein the at least one aryl group in the compound (C) is phenyl group;

(5) A hard coat film according to any one of (1) to (4), wherein the substrate is a polyarbonate film or a polyethyleneterephthalate film; and (6) A hard coat film according to any of (1) to (5), wherein the component for forming a hard coat layer comprises 100 parts by weight of (A) a compound which is formed by bonding an organic compound having a polymerizable unsaturated group to the fine particles of silica, 5 to 20 parts by weight of (B) the ester of (meth)acrylic acid having an alicyclic structure and 45 to 200 parts by weight of (C) the compound having at least two polymerizable unsaturated groups and at least one aryl group.

The numbers and characters in the figures have the meanings as listed in the following:

| 1 and 1': | Hard coat layers |
| 2: | A substrate film |
| 3 and 3': | Transparent conductive thin films |
| 4: | An insulating space |
| 5: | An insulating spacer |
| 6: | A glass substrate |
| 7: | An adhesive layer |
| 8: | A substrate of an optical disk |

DESCRIPTION OF THE PREFERRED EMBODIMENTS

The hard coat layer in the hard coat film of the present invention can be formed by coating at least one face of a substrate with a coating fluid which comprises a component for forming a hard coat layer comprising (A) a compound comprising fine particles of silica and an organic compound having a polymerizable unsaturated group and bonded to the fine particles of silica, (B) an ester of (meth)acrylic acid having an alicyclic structure and (C) a compound having at least two polymerizable unsaturated groups and at least one aryl group in a molecule, and curing a layer of the coating fluid formed on the face of the substrate by irradiation with an ionizing radiation.

The present invention will be described with reference to Figures in the following. The Figures show embodiments of the present invention and the present invention is not limited to the embodiments shown by the Figures.

Figure 1:
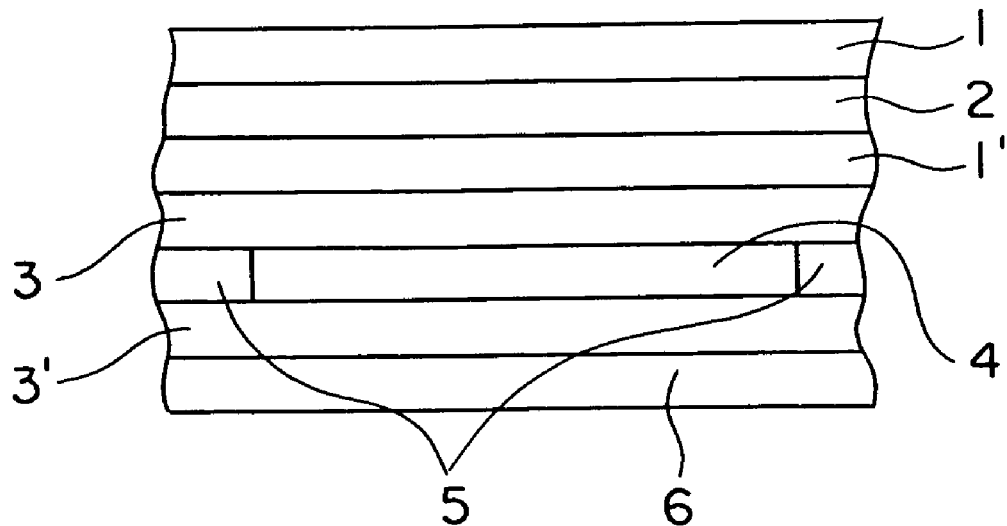
FIG. 1 shows a sectional view of a laminate portion on the surface of a touch panel of the resistance film type.

FIG. 1 shows a sectional view of a laminate portion on the surface of a touch panel of the resistance film type. The hard coat film of the present invention can be used for the laminate portion on the surface of a touch panel of the resistance film type. In the embodiment shown in FIG. 1, hard coat layers 1 and 1' are disposed on both faces of a substrate film 2. A hard coat film having the hard coat layer 1 disposed on one face of the substrate film 2 alone can be provided as another embodiment of the present invention.

A transparent conductive thin film of the touching side 3 and a transparent conductive thin film of the display side 3' are faced to each other via an insulating space 4 and an insulating spacer 5 disposed between the thin films. When the face for touching is pressed by a pen or a finger, the transparent conductive thin film of the touching side 3 and the transparent conductive thin film of the display side 3' are brought into contact with each other by the pressure transferred through the substrate film 2 and the hard coat layer of the touching side 1 and the input operation can be conducted. The laminate portion on the surface of the touch panel of the resistance film type can be formed with the layers from the hard coat layer 1 on the face for touching by a finger to the glass substrate 6 at the display side.

Figure 2:
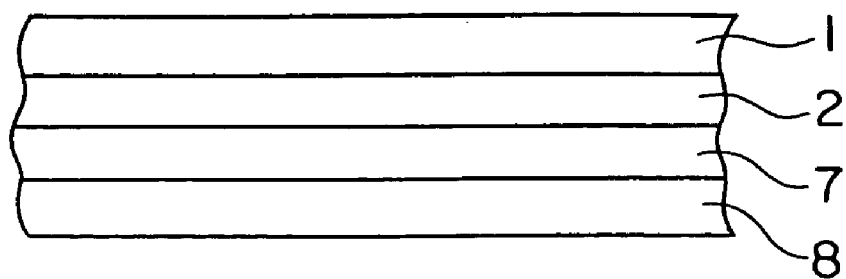
FIG. 2 shows a sectional view of a laminate portion on the surface of an optical disk.

FIG. 2 shows a sectional view of the laminate portion on the surface of an optical disk. The hard coat film of the present invention can be used for protection of the surface of optical disks such as CD and DVD.

In the embodiment shown in FIG. 2, a hard coat film having a hard coat layer 1 disposed on the surface of a substrate film 2 is attached to a substrate 8 of an optical disk via an adhesive layer 7.

As the fine particles of silica used for the component for forming the hard coat layer 1 in the hard coat film of the present invention, fine particles of silica comprising $SiO_2$ as the main component, having hydroxyl group (silanol group) on the surface of the fine particles and having an average diameter of 0.005 to 1 μm can be used. Colloidal silica suspended in a dispersion medium in the colloidal condition is preferable.

As the organic compound having a polymerizable unsaturated group and bonded to the fine particles of silica which is used for the component for forming the hard coat layer in the hard coat film of the present invention, organic compounds having in the molecule a polymerizable unsaturated group and a functional group reactive with the hydroxyl group (silanol group) on the surface of the fine particles of silica described above can be used. Examples of the polymerizable unsaturated group include (meth)acryloyl group. Examples of the functional group reactive with hydroxyl group include alkoxyl group and isocyanate group.

The compound which is formed by bonding an organic compound having a polymerizable unsaturated group to fine particles of silica and is used for the component for forming the hard coat layer in the hard coat film of the present invention contributes mainly to exhibiting the effect of suppressing the curling of the hard coat film of the present invention under a condition of a high temperature (about 80° C.) and under a condition of a higher temperature and a high humidity (a temperature of 60° C. and a relative humidity of 90%). To sufficiently exhibit the above effect, it is necessary that the hard coat layer in the hard coat film of the present invention after being cured comprises 20 to 60% by weight and preferably 25 to 40% by weight of silica. When the content of silica in the hard coat layer is smaller than 20% by weight, the effect of suppressing the curling cannot be maintained. When the content of silica exceeds 60% by weight, it becomes difficult that the hard coat layer is formed.

The ester of (meth)acrylic acid having an alicyclic structure which is used for the component for forming the hard coat layer in the hard coat film of the present invention contributes to raising the refractive index of the hard coat layer of the present invention and, in particular, to suppressing the curling accompanied with shrinking by curing the hard coat film of the present invention.

The ester of (meth)acrylic acid having an alicyclic structure which is used for the component for forming the hard coat layer in the hard coat film of the present invention is an ester obtained by condensation of an alcohol having an alicyclic structure and (meth)acrylic acid. Examples of the alcohol having an alicyclic structure include saturated alicyclic alcohols such as cyclopropane-based alcohols, cyclobutane-based alcohols, cyclopentane-based alcohols, cyclohexane-based alcohols, cycloheptane-based alcohols, cyclooctane-based alcohols and cyclododecane-based alcohols, which may each have substituents.

The alcohol having an alicyclic structure may have an unsaturated group in the molecule. Examples of the alcohol having an alicyclic structure and an unsaturated group in the molecule include unsaturated alicyclic alcohols such as cyclopropene-based alcohols, cyclobutene-based alcohols, cyclopentene-based alcohols, cyclohexene-based alcohols, cycloheptene-based alcohols, cyclooctene-based alcohols, cyclododecene-based alcohols and norbornene-based alcohols, which may each have substituents.

Among the aliciclic alcohols listed above, cyclopentane-based alcohols, cyclohexane-based alcohols, cyclopentene-based alcohols, cyclohexene-based alcohols and norbornene-based alcohols can be preferably used. Specific examples of the ester of (meth)acrylic acid having an alicyclic structure include dicyclopentanyl (meth)acrylate, dicyclopentenyloxyethyl (meth)acrylate, isobornyl (meth)acrylate and t-butylcyclohexyl (meth)acrylate.

The refractive index of the hard coat layer of the present invention is in the range of 1.53 to 1.70. When the refractive index of the hard coat layer is smaller than 1.53, there is a possibility that the optical interference fringes cannot be suppressed. It is difficult to obtain a hard coat layer having a refractive index larger than 1.70 using the art disclosed in the present invention.

The compound having at least two polymerizable unsaturated groups and at least one aryl group in the molecule which is used for the component for forming the hard coat layer in the hard coat film of the present invention contributes to raising the refractive index of the hard coat layer. Examples of the polymerizable unsaturated group include vinyl group and (meth)acryloyl group. Examples of the aryl group include phenyl group, tolyl group, xylyl group and naphthyl group. Examples of the above compound include divinylbenzene, divinylnaphthalene and polyfunctional (meth)acrylates having phenyl group.

It is preferable that the compound having at least two polymerizable unsaturated groups and at least one aryl group in the molecule has the property such that the polymer obtained by curing this compound alone has a refractive index of 1.55 or greater, since the refractive index of the hard coat layer can be easily brought to a value of 1.53 or greater.

In the present invention, it is preferable that the component for forming a hard coat layer comprises 100 parts by weight of (A) the compound comprising fine particles of silica and an organic compound having a polymerizable unsaturated group and bonded to the fine particles of silica, 5 to 20 parts by weight of (B) the ester of (meth)acrylic acid having an alicyclic structure and 45 to 200 parts by weight of (C) the compound having at least two polymerizable unsaturated groups and at least one aryl group.

When the amount of the ester of (meth)acrylic acid having an alicyclic structure of component (B) is less than 5 parts by weight, occasionally, the curling due to shrinking by curing cannot be sufficiently suppressed. When the amount of the compound having at least two polymerizable unsaturated groups and at least one aryl group of component (C) is less than 45 parts by weight, it is difficult that a hard coat layer having a refractive index of 1.53 or greater is formed.

When the amount of the ester of (meth)acrylic acid having an alicyclic structure of component (B) exceeds 20 parts by weight or the amount of the compound having at least two polymerizable unsaturated groups and at least one aryl groups of component (C) exceeds 200 parts by weight, occasionally, the curling under the condition of a high temperature or under the condition of a high temperature and a high humidity cannot be sufficiently suppressed.

In the present invention, various types of photopolymerizable monomers and photopolymerizable prepolymers can be used singly or in combination.

Examples of the photopolymerizable monomer include polyfunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri-(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propionic acid oxide, tris(acryloxyethyl) isocyanurate, dipentaerythritol penta(meth)acrylate modified with propionic acid, dipentaerythritol hexa(meth)acrylate and dipentaerythritol hexa(meth)acrylate modified with caprolactone. The above photopolymerizable monomers may be used singly or in combination of two or more. The photopolymerizable monomer may be used in combination with the photopolymerizable prepolymer.

Examples of the photopolymerizable prepolymer include polyester acrylate-based prepolymers, epoxyacrylate-based prepolymers, urethane acrylate-based prepolymers and polyol acrylate-based prepolymers. The polyester acrylate-based prepolymer can be obtained, for example, by obtaining a polyester oligomer having hydroxyl groups at the ends by condensation of a polyfunctional carboxylic acid and a polyhydric alcohol, followed by esterification of the hydroxyl groups in the obtained oligomer with (meth)acrylic acid; or by obtaining an oligomer having hydroxyl groups at the ends by addition of an alkylene oxide to a polyfunctional carboxylic acid, followed by esterification of the hydroxyl groups of the obtained oligomer with (meth)acrylic acid. The epoxyacrylate-based prepolymer can be obtained, for example, by esterification of oxirane rings in an epoxy resin of a bisphenol type or a novolak type having a relatively low molecular weight by the reaction with (meth)acrylic acid. The urethane acrylate-based prepolymer can be obtained, for example, by obtaining a polyurethane oligomer by the reaction of a polyether polyol or a polyester polyol with a polyisocyanate, followed by esterification of the obtained oligomer with (meth)acrylic acid. The polyol acrylate-based prepolymer can be obtained, for example, by esterification of hydroxyl groups in a polyether polyol with (meth)acrylic acid. The above photo-polymerizable prepolymers may be used singly or in combination of two or more.

The component for forming the hard coat film in the hard coat film of the present invention may comprise a photopolymerization initiator, where desired. Examples of the photopolymerization initiator for photopolymerizable prepolymers and photopolymerizable monomers of the radical polymerization type include benzoin, benzoin methyl ether, benzoin ethyl ether, benzoin isopropyl ether, benzoin n-butyl ether, benzoin isobutyl ether, acetophenone, dimethylacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholinopropane-1-one, 4-(2-hydroxyethoxy)phenyl 2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiarybutylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethyl-aminobenzoates.

The component for forming the hard coat layer in the hard coat film of the present invention may further comprise, where desired, various fillers such as zirconia, alumina and hydrated alumina and various additives such as antioxidants, ultraviolet light absorbents, light stabilizers, antistatic agents, leveling agents and defoaming agents for the purpose of improving the anti-glare property and the bending modulus, stabilizing the shrinkage of the volume, improving the heat resistance and adjusting the refractive index.

The coating fluid comprising the component for forming the hard coat layer in the present invention can be applied for coating after the component for forming the hard coat layer is diluted with or dissolved into an organic solvent, where necessary. Conventional organic solvents can be used without any restrictions as long as the object of forming the hard coat layer 1 in the hard coat film of the present invention on the substrate film 2 can be achieved. Examples of the organic solvent include aliphatic hydrocarbons such as hexane, heptane and cyclohexane; aromatic hydrocarbons such as toluene and xylene; halogenated hydrocarbons such as methylene chloride and ethylene chloride; alcohols such as methanol, ethanol, propanol and butanol; ketones such as acetone, methyl ethyl ketone, 2-pentanone and isophorone; esters such as ethyl acetate and butyl acetate; and cellosolve-based solvents such as ethyl cellosolve. The organic solvent may be used singly or in combination of two or more. The concentration and the viscosity of the coating fluid can be suitably selected in accordance with the object.

The process of coating for forming the hard coat layer 1 in the hard coat film of the present invention is not particularly limited as long as the object of forming the hard coat layer in the present invention can be achieved and a conventional process such as the bar coating process, the knife coating process, the Mayer bar coating process, the roll coating process, the blade coating process, the die coating process and the gravure coating process can be used to form the coating layer. When an organic solvent is contained in the coating fluid, the solvent is removed by drying after the application of the coating fluid.

As the ionizing radiation for curing the resin of the ionizing radiation curing type in the hard coat layer 1 of the present invention, ionizing radiation having an energy quantum among electromagnetic waves and beams of charged particles can be used. Examples of the ionizing radiation include ultraviolet light and electron beams. Ultraviolet light is preferable.

The ultraviolet light used for forming the hard coat layer 1 in the present invention can be obtained from a high pressure mercury lamp, a fusion H lamp or a xenon lamp. The amount of the light used for the irradiation is, in general, in the range of 100 to 500 mJ/cm$^2$.

Electron beams for forming the hard coat layer 1 in the present invention can be obtained from an electron accelerator. The amount of the beams used for the irradiation is, in general, in the range of 150 to 350 kV. When the electron beams are used, the cured film can be obtained without adding a polymerization initiator.

As for the hardness of the hard coat layer 1 in the hard coat film of the present invention, the scratch resistance sufficient for the hard coat film can be provided when the pencil hardness is H or higher. It is preferable that the hard coat layer has a pencil hardness of 3H or higher so that the scratch resistance is more sufficiently exhibited. The thickness of the hard coat layer is selected in the range of 2 to 20 µm. When the thickness is smaller than 2 µm, the scratch resistance of the hard coat film is insufficient. When the thickness exceeds 20 µm, cracks are occasionally formed and the thickness is disadvantageous from the standpoint of production. It is preferable that the thickness of the hard coat layer is in the range of 2 to 15 µm.

A rough shape may be formed on the surface of the hard coat layer in the hard coat film of the present invention to provide the anti-glare property. To form the rough shape, for example, after the resin composition of the ionizing radiation curing type is applied, a shape-forming film having a rough shape is laminated to the uncured layer formed by the application. After the uncured layer is cured by the heat curing treatment or the curing treatment with an ionizing radiation, the shape-forming film is removed.

On the surface of the hard coat layer in the hard coat film of the present invention, where necessary, a layer for preventing reflection of light such as a siloxane-based coating film and fluorine-based coating film may be formed to provide the property of preventing reflection of light. It is suitable that the layer for preventing reflection of light has a thickness in the range of about 0.05 to 1 µm. Disturbance of images on the display by reflection of light from the sun or the fluorescent light can be prevented by disposing the layer for preventing reflection of light.

It is preferable that the hard coat film of the present invention has a haze value in the range of 10% or smaller and more preferably in the range of 5% or smaller and a total light transmittance in the range of 80% or greater, more preferably in the range of 85% or greater and most preferably in the range of 85 to 95% from the standpoint of the quality of displayed images (visibility), transmission of light and transparency.

The substrate film 2 used for the hard coat film of the present invention can be suitably selected from conventional plastic films which are used as the substrate film in optical hard coat films. Plastic films which exhibit excellent affinity with the resin composition of the ionizing radiation curing type used for the component for forming the hard coat layer in the hard coat film of the present invention are preferable.

Examples of the plastic film include films of polyesters such as polyethylene terephthalate, polybutylene terephthalate, polyethylene naphthalate and polycarbonate, polyethylene films, polypropylene films, cellophane, diacetylcellulose films, triacetylcellulose films, acetylcellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, fluororesin films, polyamide films, acrylic resin films, polyurethane resin films, norbornene-based polymer films, cyclic olefin-based polymer films, cyclic conjugate diene-based polymer films and vinylalicyclic hydrocarbon polymer films.

Polyethylene terephthalate films, polycarbonate films and norbornene-based polymer films are preferable.

The thickness of the substrate film is not particularly limited. The thickness is, in general, in the range of 20 to 300 µm and preferably in the range of 50 to 250 µm. When the thickness is smaller than 20 µm, the mechanical strength is insufficient and there is the possibility that the deformation by the input with a pen is excessively great and durability is insufficient when the hard coat film is used for a touch panel. When the thickness exceeds 300 µm, the pressure required to deform the film increases when the hard coat film is used for a touch panel. Therefore, a thickness outside the above range is not preferable.

One or both surfaces of the substrate film 2 may be subjected to the treatment with a primer or the surface treatment such as oxidation or formation of rough surfaces, where desired, so that adhesion with layers disposed on the surfaces is enhanced. Examples of the surface treatment by oxidation include the treatment by corona discharge, the treatment with chromic acid, the treatment with flame, the treatment with heated air or irradiation with ultraviolet light in the presence of ozone. Examples of the treatment of formation of rough surfaces include the treatment by sand blasting and the treatment with a solvent. The surface treatment is suitably selected in accordance with the type of the substrate film. In general, the treatment by corona discharge is preferable from the standpoint of the effect and the operability.

The hard coat film of the present invention may have an adhesive layer disposed on the face of the substrate opposite to the face having the hard coat layer. The adhesive is not particularly limited and a conventional adhesive such as acrylic adhesives, rubber-based adhesives and silicone-based adhesive can be used.

To summarize the advantages obtained by the invention, the hard coat film exhibits excellent properties for touch panels and for protection of the surface of optical disks in that excellent scratch resistance, little shrinking by curing and little shrinking and curling under a high temperature and a high humidity are exhibited and no optical interference fringes are formed.

EXAMPLES

The present invention will be described more specifically with reference to examples in the following. However, the present invention is not limited to the examples.

Methods for Evaluation of the Properties of a Hard Coat Film

1) The total light transmittance (Tt) and the haze value were measured in accordance with the method of Japanese Industrial Standard K7105 using a haze meter [manufactured by NIPPON DENSHOKU KOGYO Co., Ltd.; NDH2000].
2) The pencil hardness was measured in accordance with the method of Japanese Industrial Standard K5400 using a hardness tester of a coating film by pencil scratch [manufactured by TOYO SEIKI SEISAKUSHO Co., Ltd.; the type: "NP"].
3) In the Taber test, the abrasion resistance of a hard coat film was tested using an abrasion wheel CS-10F in the condition of a load of 500 g and a rotation speed of 100 rpm and the evaluation was made from the difference in the haze value of the hard coat film before and after the wear test. The haze value was measured in accordance with the method of Japanese Industrial Standard K 7105 using a haze meter [manufactured by NIPPON DENSHOKU Co., Ltd.; NDH2000]. The abrasion resistance (the scratch resistance) could be evaluated as good when the difference in the haze value was 5 or smaller.
4) For the evaluation of the value of curling, a sample was prepared by cutting a hard coat film for the test into a square of 100 mm×100 mm and placed on a flat glass plate in a manner such that the face having the hard coat layer was placed upward. The distance by millimeter between the hard coat film and the surface of the glass plate was measured at four corners of the sample of the hard coat film and the total of the obtained four values was used as the value of curling (mm). The measurement was conducted [1] immediately after the sample was prepared by cutting the hard coat film (the initial value), [2] after the sample cut out from the hard coat film was left standing in the environment of a temperature of 80° C. for 24 hours and [3] after the sample cut out from the hard coat film was left standing in the environment of a temperature of 60° C. and a relative humidity of 90% for 24 hours. The measurement of the value of curling was conducted in the environment of a temperature of 23° C. and a relative humidity of 50%.

The curling was evaluated as "good" when the value of curling was smaller than 50 mm and "poor" when the value of curling was 50 mm or greater. When the curling was evaluated as poor, the hard coat film could not be used for practical applications.

5) For the evaluation of the optical interference fringes, a hard coat film was placed on a black board in a manner such that the face having the hard coat layer was placed upward and the formation of the optical interference fringes were evaluated by visual observation under fluorescent lights emitting light having three wave lengths. "Good" shows that weak fringes were found and "poor" shows that strong fringes were found.
6) The refractive index of a hard coat layer was measured using an Abbe refractometer manufactured by ATAGO Co., Ltd.

Example 1

A hard coating material ([manufactured by JSR Co. Ltd.; the trade name: "DESOLITE Z7527"]; the content of solid components: 52% by weight; the concentration of silica in the solid components: 60% by weight; containing a photopolymerization initiator) as the compound comprising fine particles of silica and an organic compound having a polymerizable unsaturated group and bonded to the fine particles of silica of component (A) in an amount of 100 parts by weight, 5 parts by weight of dicyclopentanyl acrylate (manufactured by HITACHI KASEI KOGYO Co., Ltd.; the trade name: "FANCRYL FA-513A"; the concentration of solid components: 100% by weight) as the ester of (meth) acrylic acid having an alicyclic structure of component (B) and 54 parts by weight of a hard coating material containing a polyfunctional acrylate having phenyl group and a photopolymerization initiator ([manufactured by KYOEISHA KAGAKU Co., Ltd.; the trade name: "LIGHT PROCOAT HIC-2000"]; the concentration of solid components: 96.6% by weight) as the compound having at least two polymerizable unsaturated groups and at least one aryl group in a molecule of component (C) were mixed together. To the obtained mixture, ethylcellosolve as the solvent was added in an amount such that the concentration of solid components was adjusted at 40% by weight and a coating fluid containing the component for forming the hard coat layer was prepared. When "LIGHT PROCOAT HIC-2000" alone was cured by irradiation with ultraviolet light, the refractive index of the cured product was 1.580.

The coating fluid was applied by a Mayer bar to one face of a polycarbonate film having a thickness of 100 μm [manufactured by TEIJIN Co., Ltd.; "PURE ACE C110-100"] as the substrate in an amount such that the hard coat layer obtained after being cured had a thickness of 5 μm. After the formed coating layer was dried at 100° C. for 1 minute, the coating layer was irradiated with ultraviolet light (the amount of the irradiation: 300 mJ/cm$^2$) to form a hard coat layer and a hard coat film was prepared. The results of evaluation of the prepared hard coat film are shown in Table 1.

Example 2

A hard coat film was prepared in accordance with the same procedures as those conducted in Example 1 except that dicyclopentanyl acrylate of component (B) was used in an amount of 8 parts by weight and the film of the substrate was changed to a polyethylene terephthalate film having a thickness of 188 µm [manufactured by TEIJIN DU PONT Co., Ltd.; "TETORON FILM OF5W"]. The results of evaluation of the prepared hard coat film are shown in Table 1.

Example 3

A hard coat film was prepared in accordance with the same procedures as those conducted in Example 1 except that the hard coating material containing a polyfunctional acrylate having phenyl group and a photopolymerization initiator ([manufactured by KYOEISHA KAGAKU Co., Ltd.; the trade name: "LIGHT PROCOAT HIC-2000"]) as the compound having at least two polymerizable unsaturated groups and at least one aryl group in a molecule of component (C) was used in an amount of 67 parts by weight and the film of the substrate was changed to a polyethylene terephthalate film having a thickness of 188 µm [manufactured by TEIJIN DU PONT Co., Ltd.; "TETORON FILM OF5W"]. The results of evaluation of the prepared hard coat film are shown in Table 1.

Comparative Example 1

A hard coat film was prepared in accordance with the same procedures as those conducted in Example 1 except that component (A) and component (B) were used and component (C) was not used for the component for forming a hard coat layer. The prepared hard coat layer showed a markedly uneven distribution of color in the evaluation of the optical interference fringes. The results of evaluation of the prepared hard coat film are shown in Table 1.

Comparative Example 2

A hard coat film was prepared in accordance with the same procedures as those conducted in Example 1 except that component (B) and component (C) were used and component (A) was not used for the component for forming a hard coat layer. The content of silica was 0. The values of curling under the condition of a high temperature and under the condition of a high temperature and a high humidity showed that this film could not be used for practical applications. The difference in the haze values in the Taber test was great and the scratch resistance was insufficient. The results of evaluation of the prepared hard coat film are shown in Table 1.

Comparative Example 3

A hard coating material of the ultraviolet light curing type comprising a polyester-based acrylate [manufactured by DAINICHI SEIKA KOGYO Co., Ltd.; SEIKA BEAM EXF-01L(NS)] (the concentration of solid components: 100% by weight) was diluted with ethyl cellosolve in an amount such that the concentration was adjusted at 40% by weight and a coating fluid for forming a hard coat layer was prepared. The prepared coating fluid was applied by a Mayer bar to one face of a polycarbonate film having a thickness of 100 µm [manufactured by TEIJIN Co., Ltd.; PURE ACE C110-100] in an amount such that the coating layer obtained after being cured had a thickness of 5 µm. The obtained coating layer was dried and irradiated with ultraviolet light and a hard coat film was prepared. The content of silica was 0. The prepared hard coat layer showed strong optical interference fringes. The initial value of curling and the values of curling under the condition of a high temperature and under the condition of a high temperature and a high humidity all showed that this film could not be used for practical applications. The results of evaluation of the prepared hard coat film are shown in Table 1.

TABLE 1

|  | Example | | | Comparative Example | | |
|---|---|---|---|---|---|---|
|  | 1 | 2 | 3 | 1 | 2 | 3 |
| Thickness of hard coat layer (mm) | 5 | 5 | 5 | 5 | 5 | 5 |
| Refractive index of hard coat layer | 1.534 | 1.537 | 1.547 | 1.493 | 1.572 | 1.515 |
| Content of silica (% by weight) | 28.6 | 27.3 | 25.6 | 54.7 | 0 | 0 |
| Total light transmittance (%) | 91.2 | 89.7 | 90.1 | 91.1 | 90.9 | 91.1 |
| Haze value (%) | 0.2 | 0.9 | 0.9 | 0.2 | 0.3 | 0.2 |
| Pencil hardness | H | 3 H | 3 H | H | H | H |
| Difference in haze values in Taber test | 2.2 | 2.8 | 2.5 | 2.4 | 6.6 | 18.1 |
| Evaluation of optical interference fringes | good | good | good | poor | good | poor |
| Curling | | | | | | |
| initial | 26 (good) | 28 (good) | 25 (good) | 15 (good) | 31 (good) | 88 (poor) |
| 80° C., dry, 24 hours | 28 (good) | 15 (good) | 27 (good) | 22 (good) | 89 (poor) | 116 (poor) |
| 60° C., 90% RH, 24 hours | 24 (good) | 17 (good) | 25 (good) | 23 (good) | 75 (poor) | 104 (poor) |

What is claimed is:

1. A hard coat film which comprises a hard coat layer formed by coating at least one face of a substrate with a coating fluid which comprises a component for forming a hard coat layer consisting essentially of (A) a compound which is formed by bonding an organic compound having a polymerizable unsaturated group to fine particles of silica, (B) an ester of (meth)acrylic acid having an alicyclic structure and (C) a compound having at least two polymerizable unsaturated groups and at least one aryl group in a molecule, wherein a polymer obtained by curing said compound (C) alone has a refractive index of 1.55 or greater, and curing a layer of the coating fluid formed on the face of the substrate by irradiation with an ionizing radiation, wherein the hard coat layer comprises 20 to 60% by weight of silica and has a refractive index of 1.53 to 1.70.

2. A hard coat film according to claim 1, wherein the organic compound having a polymerizable unsaturated group which is bonded to the fine particles of silica in the compound (A) is a compound having a (meth)acryloyl group and at least one functional group selected from the group consisting of an alkoxyl group and an isocyanate group.

3. A hard coat film according to claim 2, wherein the ester of (meth)acrylic acid having an alicyclic structure (B) is dicyclopentanyl acrylate.

4. A hard coat film according to claim 3, wherein the at least one aryl group in the compound (C) is a phenyl group.

5. A hard coat film according to claim 4, wherein the substrate is a polycarbonate film or a polyethyleneterephthalate film.

6. A hard coat film according to claim 5, wherein the component for forming a hard coat layer comprises 100 parts by weight of (A) a compound which is formed by bonding an organic compound having a polymerizable unsaturated group to the fine particles of silica, 5 to 20 parts by weight of (B) the ester of (meth)acrylic acid having an alicyclic structure and 45 to 200 parts by weight of (C) the compound having at least two polymerizable unsaturated groups and at least one aryl group.

7. A hard coat film according to claim 1, wherein the ester of (meth)acrylic acid having an alicyclic structure (B) is dicyclopentanyl acrylate.

8. A hard coat film according to claim 1, wherein the at least one aryl group in the compound (C) is a phenyl group.

9. A hard coat film according to claim 1, wherein the substrate is a polycarbonate film or a polyethyleneterephthalate film.

10. A hard coat film according to claim 1, wherein the component for forming a hard coat layer comprises 100 parts by weight of (A) a compound which is formed by bonding an organic compound having a polymerizable unsaturated group to the fine particles of silica, 5 to 20 parts by weight of (B) the ester of (meth)acrylic acid having an alicyclic structure and 45 to 200 parts by weight of (C) the compound having at least two polymerizable unsaturated groups and at least one aryl group.

11. A hard coat film according to claim 1, wherein the coating fluid further comprises at least one substance selected from the group consisting of a photopolymerizable monomer and a photopolymerizable prepolymer.

12. A hard coat film according to claim 11, wherein the coating fluid further comprises a photopolymerizable initiator.

13. A hard coat film according to claim 12, wherein the coating fluid further comprises at least one organic solvent selected from the group consisting of (i) an aliphatic hydrocarbon selected from the group consisting of hexane, heptane and cyclohexane, (ii) an aromatic hydrocarbon selected from the group consisting of toluene and xylene, (iii) a halogenated hydrocarbon selected from the group consisting of methylene chloride and ethylene chloride, (iv) an alcohol selected from the group consisting of methanol, ethanol, propanol and butanol, (v) a ketone selected from the group consisting of acetone, methyl ethyl ketone, 2-pentanone and isophorone, (vi) an ester selected from the group consisting of ethyl acetate and butyl acetate and (vii) a cellosolve-based solvent.

14. A hard coat film according to claim 13, wherein the compound (C) is a compound selected from the group consisting of divinylbenzene, divinylnaphthalene and a polyfunctional (meth)acrylate having a phenyl group.

15. A hard coat film according to claim 12, wherein the compound (C) is a compound selected from the group consisting of divinylbenzene, divinylnaphthalene and a polyfunctional (meth)acrylate having a phenyl group.

16. A hard coat film according to claim 11, wherein the coating fluid further comprises at least one organic solvent selected from the group consisting of (i) an aliphatic hydrocarbon selected from the group consisting of hexane, heptane and cyclohexane, (ii) an aromatic hydrocarbon selected from the group consisting of toluene and xylene, (iii) a halogenated hydrocarbon selected from the group consisting of methylene chloride and ethylene chloride, (iv) an alcohol selected from the group consisting of methanol, ethanol, propanol and butanol, (v) a ketone selected from the group consisting of acetone, methyl ethyl ketone, 2-pentanone and isophorone, (vi) an ester selected from the group consisting of ethyl acetate and butyl acetate and (vii) a cellosolve-based solvent.

17. A hard coat film according to claim 16, wherein the compound (C) is a compound selected from the group consisting of divinylbenzene, divinylnaphthalene and a polyfunctional (meth)acrylate having a phenyl group.

18. A hard coat film according to claim 11, wherein the compound (C) is a compound selected from the group consisting of divinylbenzene, divinylnaphthalene and a polyfunctional (meth)acrylate having a phenyl group.

19. A hard coat film according to claim 1, wherein the coating fluid further comprises at least one organic solvent selected from the group consisting of (i) an aliphatic hydrocarbon selected from the group consisting of hexane, heptane and cyclohexane, (ii) an aromatic hydrocarbon selected from the group consisting of toluene and xylene, (iii) a halogenated hydrocarbon selected from the group consisting of methylene chloride and ethylene chloride, (iv) an alcohol selected from the group consisting of methanol, ethanol, propanol and butanol, (v) a ketone selected from the group consisting of acetone, methyl ethyl ketone, 2-pentanone and isophorone, (vi) an ester selected from the group consisting of ethyl acetate and butyl acetate and (vii) a cellosolve-based solvent.

20. A hard coat film according to claim 19, wherein the compound (C) is a compound selected from the group consisting of divinylbenzene, divinylnaphthalene and a polyfunctional (meth)acrylate having a phenyl group.

21. A hard coat film according to claim 1, wherein the compound (C) is a compound selected from the group consisting of divinylbenzene, divinylnaphthalene and a polyfunctional (meth)acrylate having a phenyl group.

* * * * *